United States Patent [19]

Waltrip

[11] 4,135,888
[45] Jan. 23, 1979

[54] ENRICHED FUEL MAKING AND SEWAGE TREATING PROCESS

[75] Inventor: Owen R. Waltrip, Roseville, Calif.

[73] Assignee: Nuclear Supreme, Casper, Wyo.

[21] Appl. No.: 835,022

[22] Filed: Sep. 20, 1977

[51] Int. Cl.² .......................... C10L 5/00; C10L 9/00
[52] U.S. Cl. ....................................... 44/1 D; 44/1 F; 44/10 A; 44/10 C
[58] Field of Search ............. 44/1 R, 1 D, 1 F, 10 A, 44/10 C, 10 F; 201/21, 22, 25, 38, 41

[56] References Cited

U.S. PATENT DOCUMENTS

| 1,903,237 | 3/1933 | Johnson | 201/38 X |
| 3,506,414 | 4/1970 | Skendrovic | 44/1 R |
| 3,525,673 | 8/1970 | Cameron | 201/38 X |
| 3,909,364 | 9/1975 | Singh | 201/21 X |

Primary Examiner—Carl Dees
Attorney, Agent, or Firm—Clarence A. O'Brien; Harvey B. Jacobson

[57] ABSTRACT

Particulate coke and raw sewage are mixed and conveyed as a slurry through series connected, pressure sealed chambers into which super-heated steam is injected to convert the mixture into a molten mass depleted of noxious gases and volatiles. The molten mass is compacted while exposed to reactive hydrogen gas to form an enriched solid fuel log.

9 Claims, 4 Drawing Figures

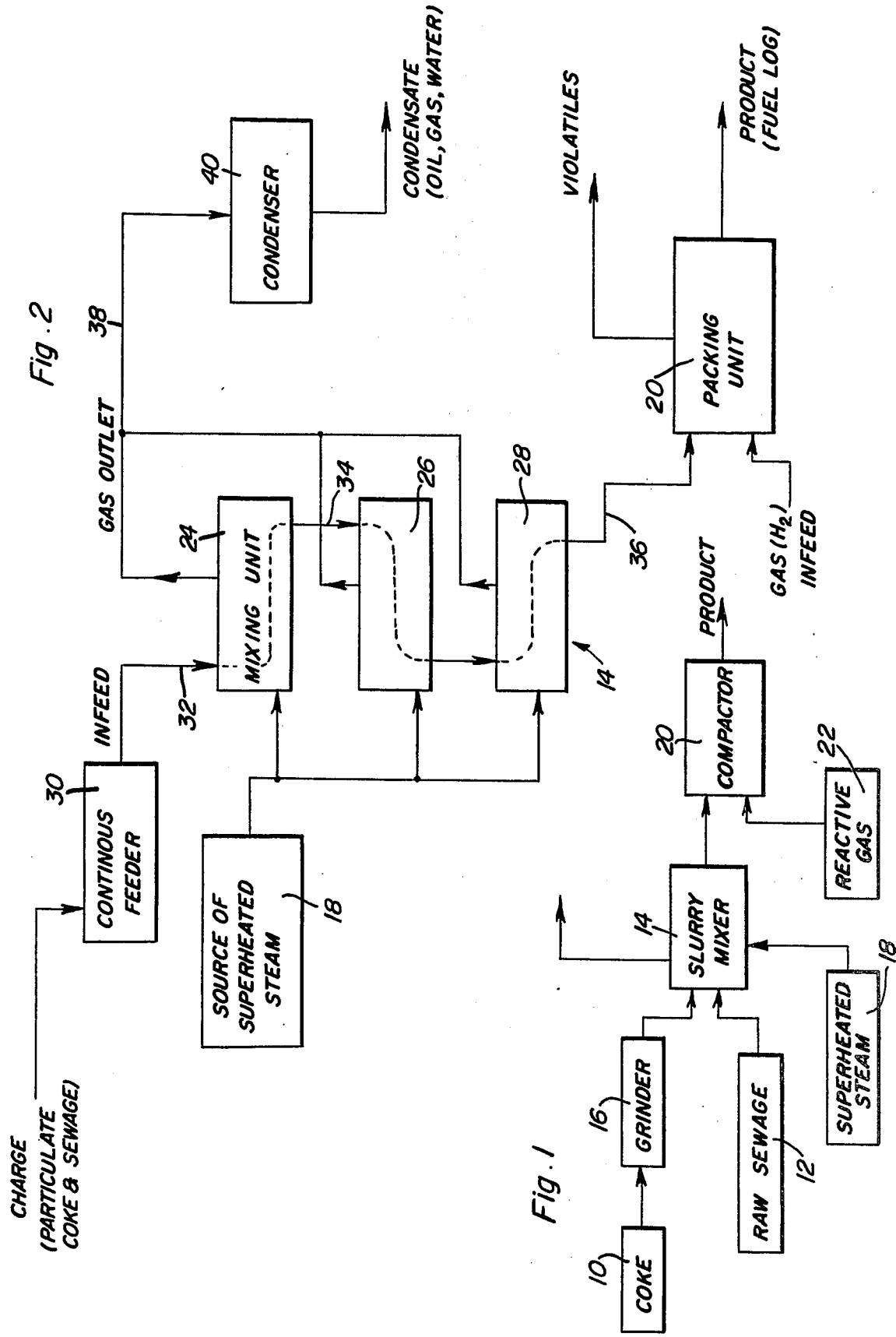

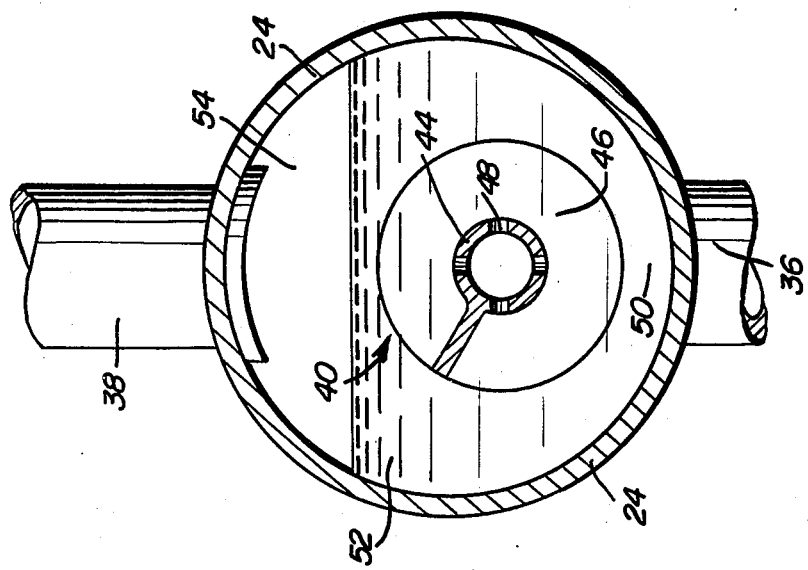
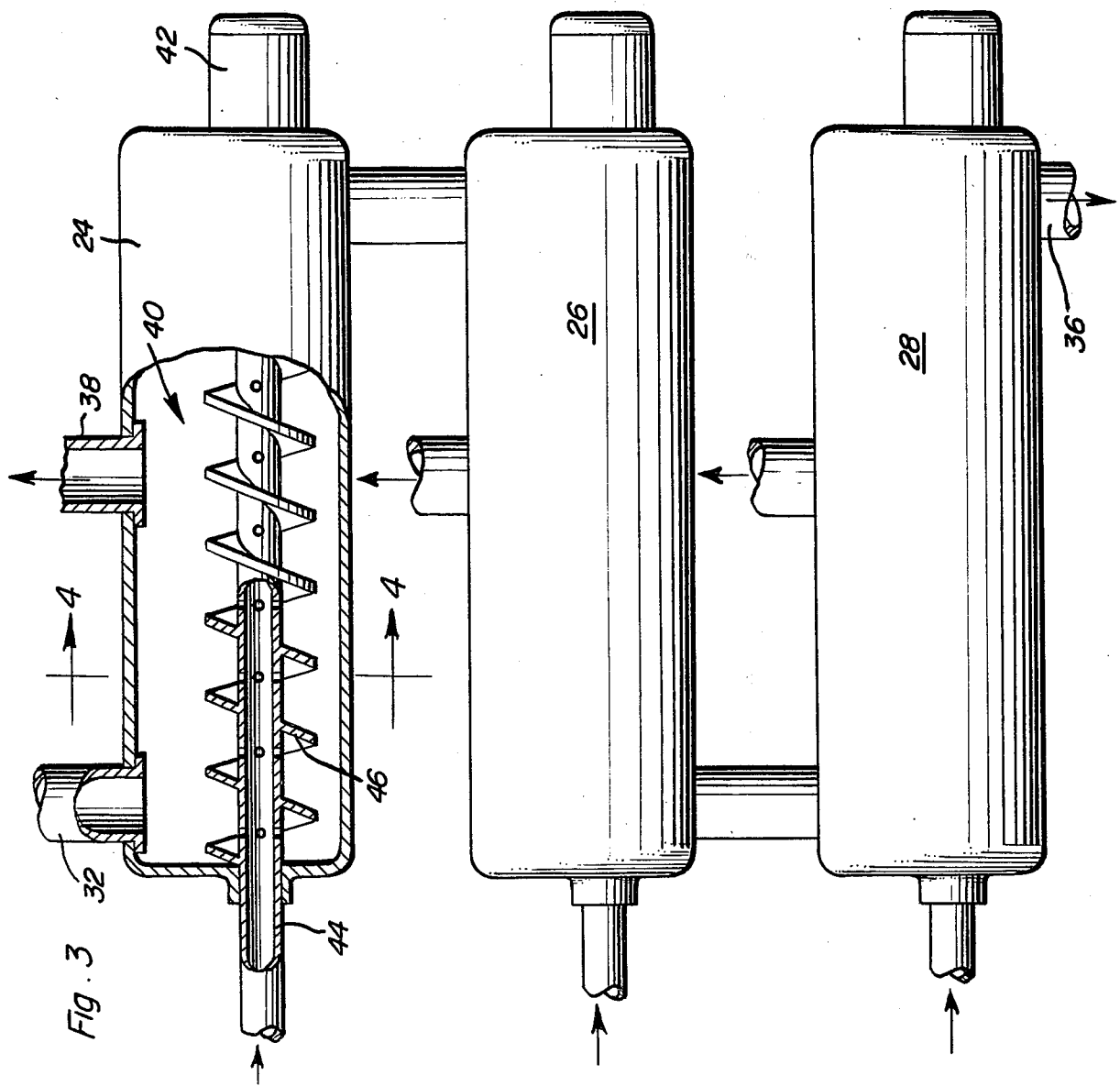

ENRICHED FUEL MAKING AND SEWAGE TREATING PROCESS

BACKGROUND OF THE INVENTION

This invention relates to the treatment of sewage and enrichment of solid fuels, and is related to the subject matter in my prior co-pending application, Ser. No. 703,438, filed July 8, 1976, now abandoned and the subject matter in my prior application, Ser. No. 704,077, filed July 9, 1976, now U.S. Pat. No. 4,028,040.

In my prior related applications aforementioned, the treatment of sewage and various hydrocarbon solids is dealt with in connection with the production of various petrochemical products. In general, steam is mixed with the raw feed under controlled temperature and pressure conditions effecting release of gases and volatiles therefrom, and a solid residue recovered. The prior art of record in the aforementioned prior related applications also discloses apparatus utilized in such processes, including the conveyance of slurries by bottom-mounted augers through horizontally elongated chambers into which steam is injected. Such prior apparatus and processes have been utilized for distilling hydrocarbons from granular materials such as wood or extraction of oil from oil shale and sand. The treatment of solid fuels such as coal and coke is also disclosed, including its hydrogenation and the removal of sulphur compounds therefrom.

The use of such apparatus and methods as aforementioned for enrichment of low energy content, solid fuels by treatment with raw sewage has not been fairly taught until now, and it is therefore an important object of the present invention to provide apparatus of the aforementioned type specifically adapted for the simultaneous treatment of raw sewage and enrichment of solid fuels. The foregoing objective is especially important in view of the present awareness of ecological deterioration caused by untreated sewage and the need for alternative sources of fuel. It is therefore another object of the present invention to provide an economical method of making an enriched fuel from relatively inexpensive and waste materials.

SUMMARY OF THE INVENTION

In accordance with the present invention, a relatively low energy content fuel such as particulate coke is mixed with raw sewage to form a slurry that is conveyed through series connected chambers maintained at desired temperature and pressure conditions by injection of super-heated steam into the chambers. The slurry is conveyed through the chambers by bottom mounted augers having clearance from the walls of the chamber to accommodate mixing and agitation as well as collection of evolved gases and volatiles that are removed and passed through a condenser for recovering non-noxious fluids including oil, gas and water. A liquid-depleted residue is then conducted from the mixing chambers into a packing unit into which reactive hydrogen gas is injected. The residue or mass introduced into the packing unit is compacted in order to form a solid fuel log. A packing unit such as that disclosed in my prior U.S. Pat. No. 4,028,040, aforementioned, may be utilized for this purpose.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWING FIGURES

FIG. 1 is a simplified block diagram illustrating the method of the present invention.

FIG. 2 is a block diagram showing the arrangement of apparatus for carrying out the method.

FIG. 3 is a side elevational view with parts broken away and shown in section of certain components of the apparatus diagrammed in FIG. 2.

FIG. 4 is a transverse section view taken substantially through a plane indicated by section line 4—4 in FIG. 3.

DETAILED DESCRIPTION OF A PREFERRED EMBODIMENT

Referring now to the drawings in detail, FIG. 1 diagrammatically depicts the method of the present invention which involves coke from a suitable source 10 and raw sewage from a source 12 that are mixed within a slurry mixer generally referred to by reference numeral 14. The coke is ground by a grinder 16 into particulate form prior to being mixed with the raw sewage for the purpose of the present invention. Super-heated steam from a source 18 is supplied to the mixer 14 in order to establish predetermined temperature and pressure conditions within the mixer necessary to effect conversion of the sewage into a form capable of ultimately enriching the coke and releasing non-noxious gases and volatiles. The actual temperature and pressure conditions will depend on the content of the sewage and its establishment by control over the superheated steam is well within the capabilities of those skilled in the art. A liquid-depleted residue or mass is accordingly discharged from the mixer into a compactor stage 20 into which a reactive gas such as hydrogen is injected from source 22. The mass supplied to the compactor 20 is in a molten state and is converted into a solid fuel log by compaction and cooling as disclosed for example in my prior U.S. Pat. No. 4,028,040, aforementioned.

As shown in FIG. 2, the slurry mixer stage 14 includes three mixing units 24, 26 and 28, interconnected so as to enable feed of the slurry in series therethrough. A continuous feeder 30 into which the particulate coke and sewage is charged, supplies the slurry to the first mixing unit 24. The slurry is conveyed horizontally through the mixing unit 24 from one axial end at inlet 32 to the other axial end at outlet 34, from which the slurry is gravitationally discharged into the second mixing unit 26. The slurry is conveyed in the opposite direction through the second mixing unit and discharged gravitationally into the third mixing unit 28 from which a molten residue is discharged at final outlet 36 into the packing unit 20 as aforementioned. The fuel log product is obtained from the packing unit 20 while volatiles are discharged therefrom. The non-noxious gases evolved from the slurry within the mixing units is collected through a gas outlet 38 and passed through a condenser 40 to discharge a condensate in the form of water and hydrocarbon fluids.

As more clearly seen in FIGS. 3 and 4, each of the mixing units 24, 26 and 28 are similar in construction and operation to each other, except for the directions of feed. The uppermost and lower most mixing units 24 and 28 are operative through auger-type devices 40 to pull the slurry through horizontal pressure sealed chambers. The auger devices 40 are driven by speed synchronized electric motors 42 connected to tubular auger shafts 44 on which the spiral flights 46 of the auger devices are mounted. The super-heated steam is introduced into the chamber or mixing zones through openings 48 formed within the tubular shafts 44. As will be observed from FIG. 4, the tubular shaft 44 is rotatably mounted in eccentric relation to the longitudinal axis of the unit housing and the auger flights 46 mounted thereon are dimensioned so as to provide sufficient clearance 50 adjacent the bottom of the chamber to enable the rotating auger device to adequately mix and agitate the slurry 52 being fed through the chamber. The clearance above the auger device 40 is sufficient to enable formation of a gas space 54 within which the non-noxious gas and volatiles are collected and removed through the gas outlet 38 as aforementioned. The foregoing relationship of the auger device to the mixing chamber enables the slurry to be acted upon by the super-heated steam and under the prevailing temperature and pressure conditions to eventually discharge from the final unit 38 a suitable molten mass or residue.

The reaction of the molten mass with the hydrogen gas within the packing unit 20 has been found to produce under compaction pressure a solid fuel log that is free of sewage contamination and has a significantly higher energy content than the coke introduced into the process.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a process for producing a solid fuel from a slurry formed from raw sewage and particulate coke, the steps of: conducting said slurry through a plurality of pressure sealed zones in series; physically agitating the slurry during movement through said zones; injecting super-heated steam into said zones during said movement of the slurry therethrough to release only non-noxious gases and volatiles leaving a liquid depleted residue; compacting the residue discharged under pressure from the zones within a reaction zone; injecting hydrogen gas into the reaction zone during compaction of the residue to form a compacted mass; and cooling said compacted mass to form the solid fuel product.

2. The process of claim 1 wherein said non-noxious gases and volatiles are water and hydrocarbon gases and vapors.

3. The process of claim 2, wherein said slurry is conveyed through the mixing zones by forced feed flow.

4. The process of claim 1 wherein said slurry is conveyed through the mixing zones by forced feed flow.

5. A method of continuously treating raw sewage and enriching a relatively low energy content solid fuel, comprising the steps of: grinding said solid fuel into particles; mixing said particles with the raw sewage to form a slurry; mixing the slurry during movement with super-heated steam until non-noxious gases and volatiles are evolved therefrom, leaving a liquid depleted mass; exposing said mass to a reactive gas other than steam; and compacting said mass into a solid fuel product.

6. The method of claim 5 wherein said low energy content solid fuel is coke.

7. The method of claim 6 wherein said reactive gas is hydrogen.

8. The method of claim 5 wherein said reactive gas is hydrogen.

9. A method of treating sewage which comprises mixing the sewage with particulate coke within a pressure sealed chamber; subjecting the mix to the action of heat during movement through said chamber by mixing with superheated steam; extracting volatile by-products from the chamber during the heating operation; discharging a liquid-depleted residue of said mix from said chamber; compacting said residue; and subjecting said residue to hydrogen gas during compaction thereof.

* * * * *